United States Patent [19]

Wallace et al.

[11] Patent Number: 4,663,143
[45] Date of Patent: May 5, 1987

[54] HYDROGEN STORAGE MATRIALS OF $CENI_{5-x}MN_x$ ALLOYS

[75] Inventors: William E. Wallace, Pittsburgh, Pa.; Faiz Pourarian, Qazvin, Iran

[73] Assignee: Koppers Company, Inc., Pittsburgh, Pa.

[21] Appl. No.: 563,955

[22] Filed: Dec. 21, 1983

[51] Int. Cl.⁴ .................................. C22C 19/00
[52] U.S. Cl. ............................... 423/644; 420/455; 420/459; 420/900
[58] Field of Search ............. 420/900, 443, 459, 455; 423/644, 648 R

[56] References Cited

U.S. PATENT DOCUMENTS 3,825,418  7/1974  Reilly et al. ................. 420/900
4,378,331  3/1983  Bruning et al. ............... 420/455

FOREIGN PATENT DOCUMENTS 2833852  2/1979  Fed. Rep. of Germany ...... 420/455
140222  12/1978  Japan .......................... 420/455

OTHER PUBLICATIONS van Vucht J. H. N. et al, "Reversible Room-Temperature Absorption of Large Quantities of Hydrogen by Intermetallic Compounds" Philip-Res. Rept. 25 133-140 (1970).

Primary Examiner—Christopher W. Brody
Attorney, Agent, or Firm—Donald M. MacKay; Herbert J. Zeh, Jr.

[57] ABSTRACT

A ternary alloy comprised of cerium, nickel and manganese is characterized in having $CaCu_5$ hexagonal crystal structure and stoichiometry. Members of a preferred class of compounds, represented by the empirical formula $CeNi_{5-x}Mn_x$ wherein "x" has a value between 0.1 and about 1.0. These alloys react with hydrogen readily and can absorb a large amount of hydrogen at moderate pressure and temperature and are particularly suitable for use as hydrogen storage materials.

8 Claims, 7 Drawing Figures

HYDROGEN STORAGE MATERIALS OF CENI$_{5-x}$MN$_x$ ALLOYS

BACKGROUND OF THE INVENTION

1. Field of the Invention

Many types of intermetallic compounds are known for use as hydrogen storage materials. Of particular interest herein are hydrogen storage materials provided by three-component alloys of cerium, nickel and manganese having the CaCu$_5$ hexagonal-type crystal structure and stoichiometry.

2. State of the Art

A material suitable for storage of hydrogen must satisfy many demanding criteria. In addition to large storage capacity for hydrogen, a hydride formed during hydrogen absorption by a material should have low enthalpy characteristics; that is, the quantity of heat per mole of alloy required for formation of the hydride is preferably relatively low. Also, the hydrogen storage material should absorb and desorb hydrogen quickly, preferably at a pressure near one atmosphere and near room temperature, and with a well defined flat and the material plateau pressure region should region should show a minimum of hysteresis effects during a hydrogen absorption/desorption cycle.

One family of intermetallic compounds receiving much attention for use as hydrogen storage materials is that provided by LaNi$_5$-type compounds characterized by hexagonal CaCu$_5$ crystal structure and stoichiometry. In search of improved LaNi$_5$-type systems, alloys have been prepared which contain other elements substituted for all or a portion of the lanthanum, but with the CaCu$_5$ stoichiometry maintained in the new alloy. For example, in Van Vancht et al., *Philips Res. Repts.* 25, 133 (1970), there are described alloys such as CeNi$_5$ and the quasi-binary system La$_{1-x}$Ce$_x$Ni$_5$.

A comprehensive study of hexagonal AB$_5$, that is, the CaCu$_5$ crystal system, was reported by Lundin et al., *J. Less-Common Met.* 56, 19-37 (1977). Data were obtained for over 30 three-component alloys, such as lanthanum-cerium-nickel and lanthanum-nickel-copper systems. None of these alloys, however was characterized in having the combined properties of relatively low enthalpy, minimal hysteresis effects, and large hydrogen storage capacity.

SUMMARY OF THE INVENTION

Improved hydrogen storage materials are provided by a ternary alloy consisting essentially of cerium, nickel and manganese, which is characterized in having the CaCu$_5$ hexagonal-type crystal structure and stoichiometry. A representative family of such alloys may be expressed by the empirical formula CeNi$_{5-x}$Mn$_x$ wherein "x" has a value in a range between 0.1 and about 1.0. Such family of alloys are derived from the CeNi$_5$ system in which nickel has been partially replaced by manganese. These alloys are capable of forming hydrides having vapor pressures within a range to make the alloys of practical interest. Alloys of particular interest within the scope of the formula I family of compounds are as follows:

CeNi$_{4.5}$Mn$_{0.5}$

CeNi$_{4.4}$Mn$_{0.6}$

CeNi$_{4.25}$Mn$_{0.75}$

CeNi$_{4.15}$Mn$_{0.85}$

Each of these specific alloys is characterized in having a desirable combination of properties, namely, relatively low enthalpy as compared to LaNi$_5$ systems and minimal hysteresis effects as compared to CeNi$_5$, while also having fairly large hydrogen storage capacities.

DESCRIPTION OF PREFERRED EMBODIMENTS

A ternary alloy of the invention is characterized generally as a Haucke-type intermetallic compound composed of cerium, nickel and manganese in a CaCu$_5$ hexagonal crystal structure. The crystal structure is characterized by lattice parameters having approximate values in the following ranges:

a=4.90 Å to 4.93 Å c=4.04 Å to 4.07 Å

A general procedure for preparation of these ternary alloys is as follows. Weighed amounts of the cerium, nickel and manganese constituents are placed in a copper boat for heating to a fusing temperature. Heating is accomplished typically by means of an r.f. 450 KHz induction heater. The copper boat is mounted inside a vaccum-tight quartz tube through which a stream of Ti-gettered argon passes during the heating period. Fusing of the constituents takes place by heating a mixture of the constituents to about 1500° C. in about two minutes, and holding at that temperature for about two minute. Then the sample is cooled to room temperature in a period of about one minute and the hardened sample is turned over in the boat. Melting and cooling are repeated through four cycles, typically. Then the sample is annealed for a period of about two hours at about 1100° C. X-ray diffraction analysis of the annealed sample typically shows a material consisting of a single phase.

In order to activate the sample to make it suitable as a hydrogen storage material, about two grams of the annealed sample is placed in a stainless steel pressure reactor vessel suitable for use in forming a hydride of the sample. The reactor is evacuated to a pressure of about 10$^{-3}$ Torr. Then pure hydrogen is pumped into the reactor to a pressure of about 40 to 50 atm., with the reactor vessel temperature initially at about 25° C., until hydrogen is no longer absorbed by the sample. Usually, within two minutes of the time hydrogen is initially introduced into the reactor, the reaction vessel temperature increases to about 50° C. Then the reactor is allowed to cool to room temperature over a period of about 30 minutes, after which time the pressure within the reactor is usually about 45 atm. The pressure in the reactor is reduced to ambient, and then the sample is subjected to a pressure of about $10^{-3}$ Torr for about 20 minutes in order for the sample to desorb substantially all of the previously-absorbed hydrogen.

In order to obtain a fully-activated hydrogen storage material, the sample is subjected to about 25 absorption-desorption cycles, under conditions as described for the activation procedure above. At the end of this activating period, there is obtained a repeatable pressure-composition profile. To obtain crystal structure data on the hydrides, a portion of the activated sample is hydrogenated to a known composition in accordance with the previously-established pressure-composition isotherm. Then the hydrogenated sample is cooled quickly by quenching the sample boat (reactor) in liquid nitrogen, and rapidly pumping away remaining gaseous hydrogen. In accordance with the technique of Gualtieri et al., [*J. Appl. Phys.*, 47, 3432 (1976)], a few Torr of $SO_2$ is admitted to the reaction vessel to poison the surface of the sample, and thereby seal in the hydrogen. After the sample warms to room temperature, x-ray diffraction data are obtained for the sample.

In order to demonstrate the preparation of the cerium-nickel-manganese ternary alloys and their hydrides, and to obtain data as to characteristics and properties of the alloys, four ternary alloys containing varying amounts of nickel and manganese were actually prepared in accordance with the aforementioned, generally-described procedures. Essential parameters such as constituent weights, lattice parameters and hydriding characteristics and thermodynamic properties are summarized in Tables I and II. The cerium constituent was 99.9 percent pure and used as obtained from Lot No. Ce-M-3, NUCOR Corp., Research Chemicals Div., Phoenix AZ. Nickel at 99.99 percent purity and manganese at 99 percent purity were obtained from Alfa Products, Ventron Div., Danvers, MA.

TABLE I

Preparation of Cerium - Nickel - Manganese Ternary Alloys

| Sample No. | Alloy | Amount of Each Constituent (gm) | | | Annealing | |
|---|---|---|---|---|---|---|
| | | Ce | Ni | Mn | Temp (c) | Period (hrs) |
| I | CeNi$_{4.5}$Mn$_{0.5}$ | 1.390 | 2.620 | 0.272 | 1100 | 2 |
| II | CeNi$_{4.4}$Mn$_{0.6}$ | 1.420 | 2.617 | 0.334 | 1100 | 2 |
| III | CeNi$_{4.25}$Mn$_{0.25}$ | 1.404 | 2.502 | 0.413 | 1000 | 3 |
| IV | CeNi$_{4.15}$Mn$_{0.85}$ | 1.410 | 2.451 | 0.469 | 1000 | 3 |

TABLE II

Lattice Parameters and Hydrogen Absorption for Cerium-Nickel-Manganese Ternary Alloys

| Sample No. | Alloy Alloy Hydride | Lattice Parameters | | Unit Cell Volume of Sample V (Å)$^3$ | Hydrogen Storage Capacity ml H$_2$ per gm alloy |
|---|---|---|---|---|---|
| | | a(Å) | c(Å) | | |
| I | CeNi$_{4.5}$Mn$_{0.5}$ | 4.904 | 4.040 | 84.14 | 135 |
| | CeNi$_{4.5}$Mn$_{0.5}$H$_{4.8}$ | 5.357 | 4.291 | 106.64 | 135 |
| II | CeNi$_{4.4}$Mn$_{0.6}$ | 4.901 | 4.045 | 84.45 | 148 |
| | CeNi$_{4.4}$Mn$_{0.6}$H$_{5.25}$ | 5.360 | 4.287 | 106.66 | 148 |
| III | CeNi$_{4.25}$Mn$_{0.75}$ | 4.921 | 4.054 | 85.02 | 169 |
| | CeNi$_{4.25}$Mn$_{0.75}$H$_{6.0}$ | 5.363 | 4.282 | 106.65 | 169 |
| IV | CeNi$_{4.1}$Mn$_{0.85}$ | 4.930 | 4.065 | 85.47 | 141 |
| | CeNi$_{1.41}$Mn$_{0.85}$H$_{5.0}$ | 5.368 | 4.278 | 106.75 | 141 |

The pressure-composition isotherms of FIGS. 1–4 for two representative embodiments of the cerium-nickel-manganese alloy system of the invention demonstrate important advantages of this ternary system. For example, at about room temperature the alloy with the composition CeNi$_{4.25}$Mn$_{0.75}$ can be hydrogenated and dehydrogenated at hydrogen pressures less than 4 atm. Also, the alloys absorb and desorb hydrogen at a fairly constant pressure over a wide range of hydrogen concentration, namely, from about 0.5 to about 4.5 gram-atom of hydrogen per mole of alloy. The substitution of 15% of Ni by Mn has reduced the absorption vapor pressure of CeNi$_5$ hydride by more than 250 fold and also reduced the hysterisis effect by approximately 3 fold.

Figure 1:
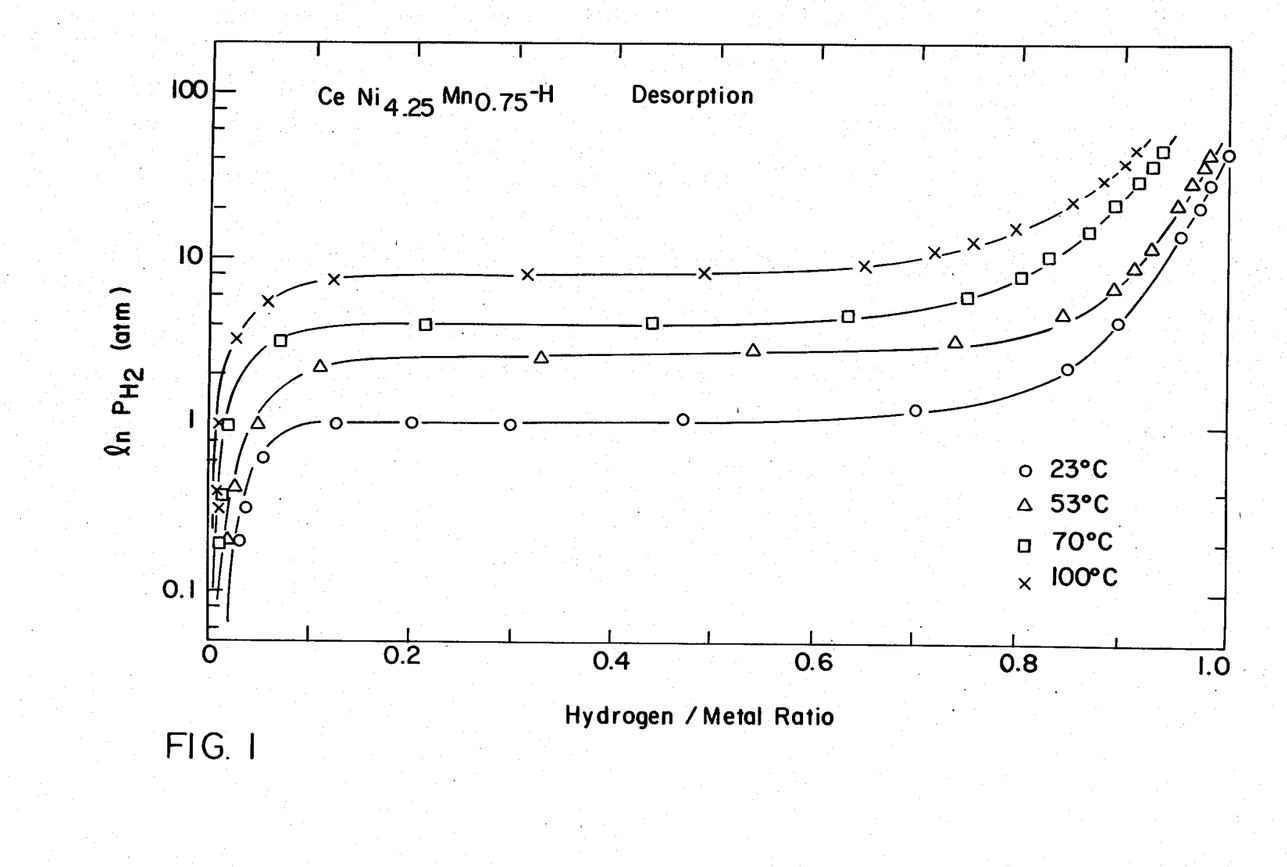
FIGS. 1 and 2 are equilibrium desorption and absorption pressure-composition isotherms for the system CeNi$_{4.25}$Mn$_{0.75}$—H$_2$, which is a representative ternary alloy hydride of the invention.
Figure 2:
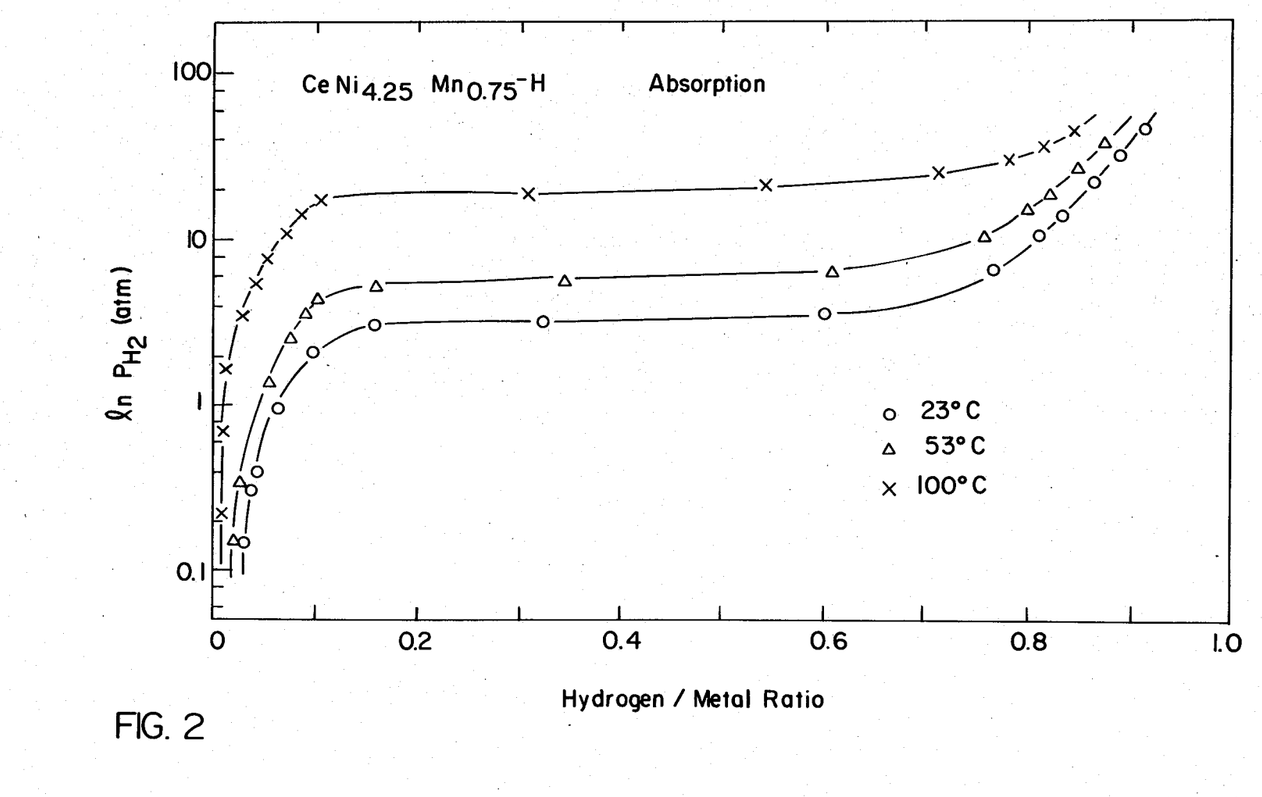
Figure 3:
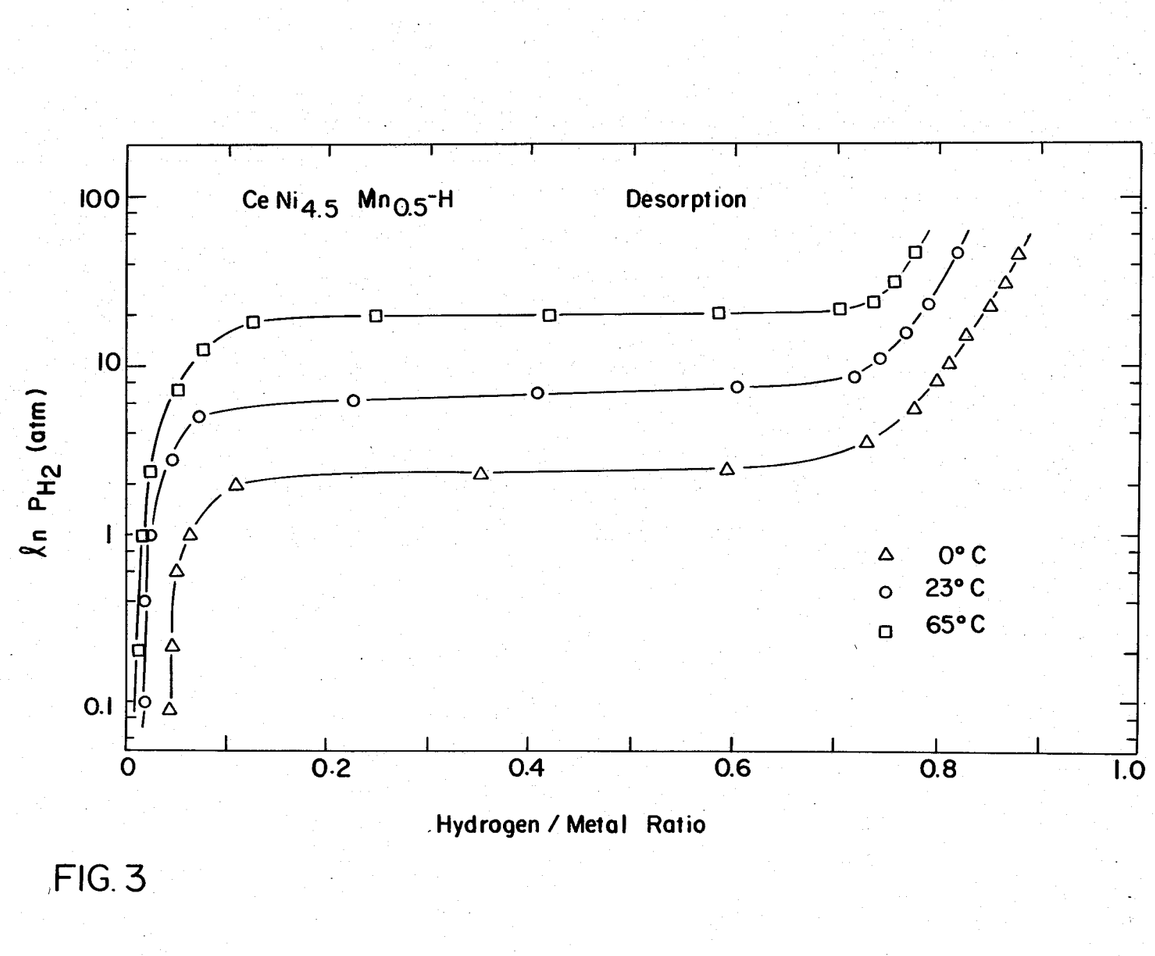
FIGS. 3 and 4 are equilibrium desorption and absorption pressure-composition isotherms for the system CeNi$_{4.5}$Mn$_{0.5}$—H$_2$, which is another representative ternary alloy hydride of the invention.
Figure 4:
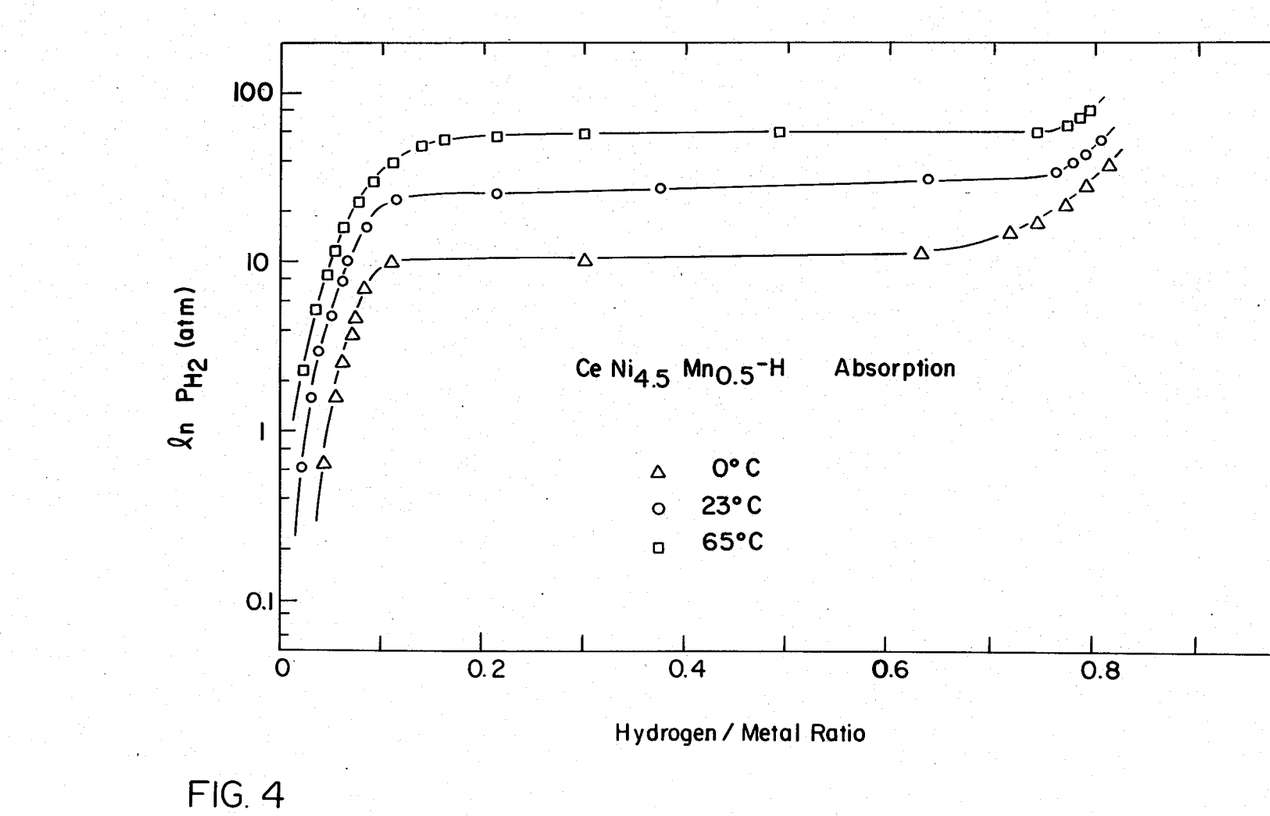
Figure 5:
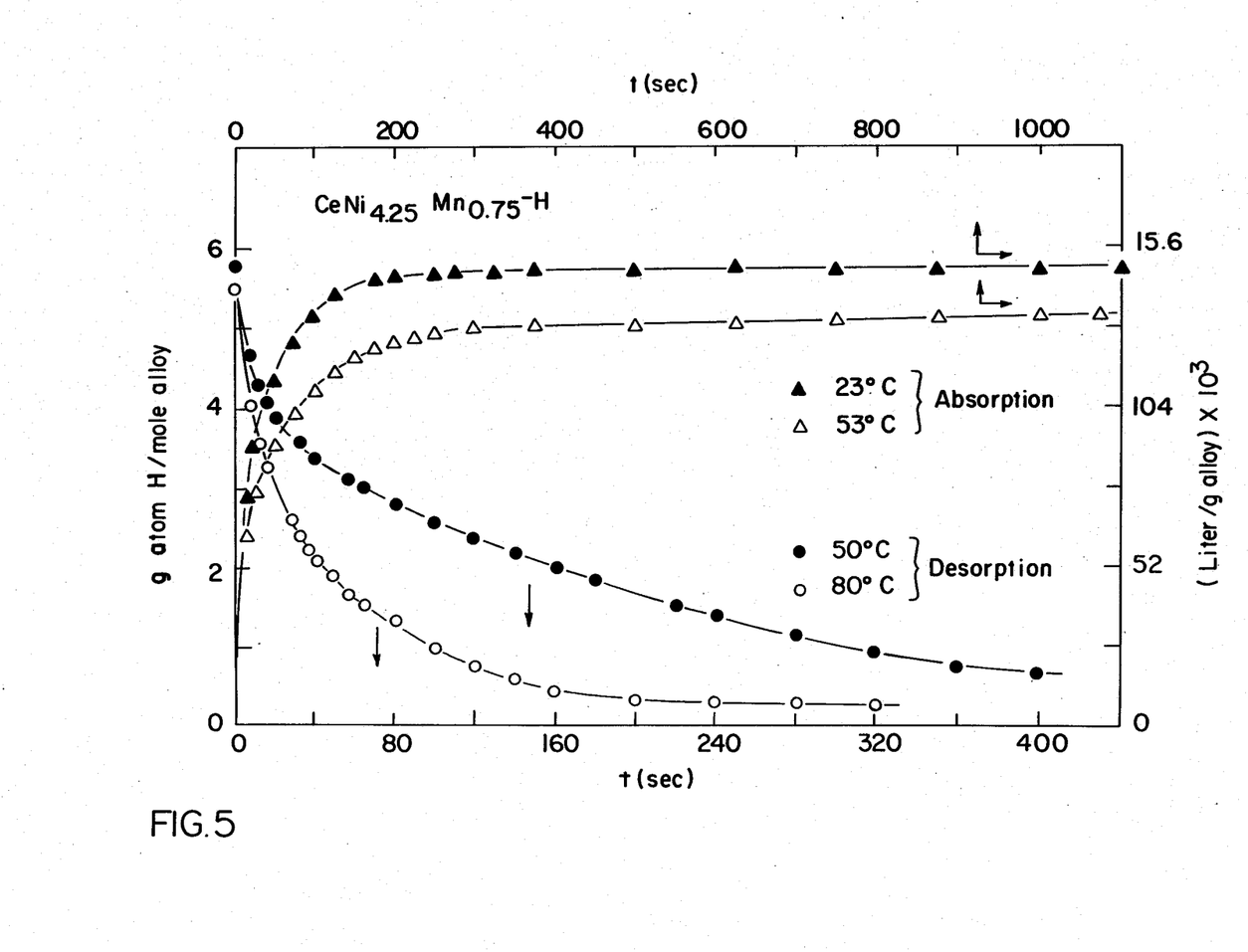
FIG. 5 shows plots of the rates of absorption of hydrogen at 23° C. and 53° C. and desorption of hydrogen at 50° C. and 80° C. by the system CeNi$_{4.25}$Mn$_{0.75}$ respectively.
Figure 6:
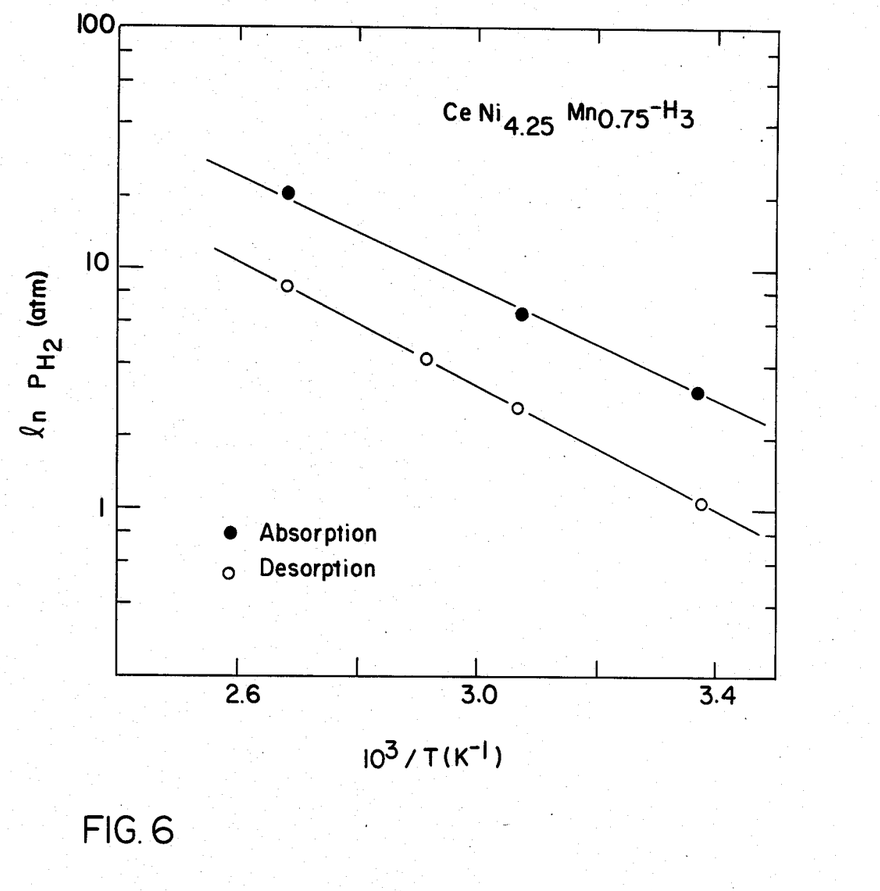
FIG. 6 shows the linear dependance of the equilibrium hydrogen pressure on the absolute inversion temperature.
Figure 7:
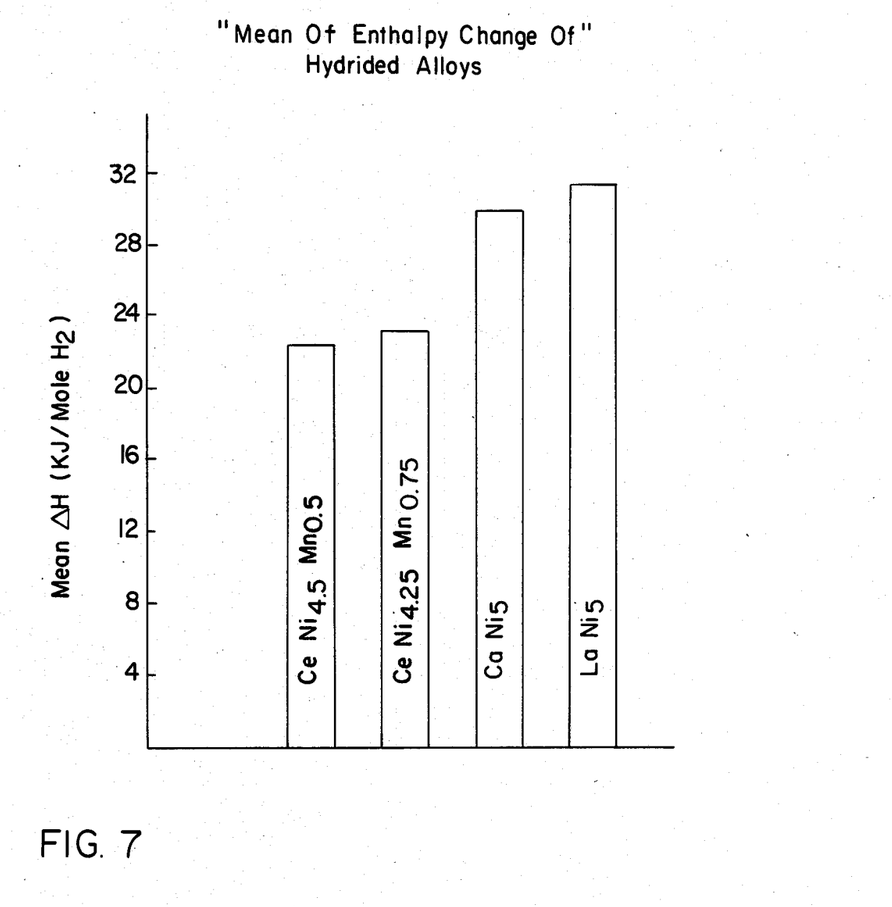
FIG. 7 is a comparison of mean enthalpies of the system CeNi$_{5-x}$Mn$_x$—H$_2$ with prior art hydride systems.

The ternary alloys of the invention are also characterized by rapid absorption/desorption of hydrogen. As shown in FIG. 5, a condition of 90 percent complete absorption or desorption of hydrogen can be obtained in less than about 2 minutes and 5 minutes respectively. The two ternary alloys of the invention have relatively low enthalpy ($\Delta H$) and entropy ($\Delta S$) as compared to LaNi$_5$ hydride and CaNi$_5$ hydride systems. In particular, the enthalpy or the mean enthalpy change of the hydride alloys of the invention are relatively lower than those of known hydrogen storage materials such as the hydrides of LaNi$_5$ and CaNi$_5$ systems, as depicted in FIG. 7. The small value of $\Delta H$ is significant in regard to the exploitation of hydrogen as a fuel. As the heat absorbed in the release of hydrogen is smaller, the fuel value of the hydrogen stored in the hydride is correspondingly enhanced since less heat must be allocated to effect the endothermal release of hydrogen from the hydride. The small value of $\Delta H$ has the additional advantage in that heat flow demands are reduced. This could be a significant factor in large-scale applications involving massive hydride beds since such beds have poor thermal conductivity characteristics.

Although specific examples of the invention have been set forth hereinabove, it is not intended that the invention be limited solely thereto, but is to include all the variations and modifications falling within the scope of the appended claims.

What is claimed is:

1. A ternary alloy consisting essentially of cerium, nickel and manganese, and having the CaCu$_5$ hexagonal crystal structure, said alloy being a CeNi$_5$ system in which nickel has been partially replaced with manganese, and their hydrides.

2. The alloy of claim 1 having said elements in an atomic ratio as expressed by any of the following formulae:

$CeNi_{4.5}Mn_{0.5}$ $CeNi_{4.4}Mn_{0.6}$ $CeNi_{4.25}Mn_{0.75}$ $CeNi_{4.15}Mn_{0.85}.$

3. The hydrides of the alloys represented by the formulae of claim 2.

4. A ternary alloy of elements expressed by the following formula $CeNi_{5-x}Mn_x$ wherein "x" has a value in a range between nearly 0.1 and about 1.0.

5. The alloy of claim 4 wherein "x" has a value of about 0.5.

6. The alloy of claim 4 wherein "x" has a value of about 0.6.

7. The alloy of claim 4 wherein "x" has a value of about 0.75.

8. The alloy of claim 4 wherein "x" has a value of about 0.85.

* * * * *